United States Patent [19]

Aoshima et al.

[11] 4,241,288
[45] Dec. 23, 1980

[54] ELECTRIC RICE COOKER WITH TWO HEATERS

[75] Inventors: Terutaka Aoshima, Toyohashi; Tokihiko Ikemizu, Kasugai, both of Japan

[73] Assignee: Tokyo Shibaura Denki Kabushiki Kaisha, Kawasaki, Japan

[21] Appl. No.: 94,936

[22] Filed: Nov. 16, 1979

[30] Foreign Application Priority Data

Dec. 28, 1978 [JP] Japan .................................. 53-182217

[51] Int. Cl.³ ............................................. F27D 11/02
[52] U.S. Cl. ..................................... 219/441; 99/332; 219/432; 219/433; 219/438; 219/442
[58] Field of Search ............... 219/385, 386, 430, 432, 219/433, 438, 439, 441, 442; 99/295, 331, 332, 333, 335

[56] References Cited

U.S. PATENT DOCUMENTS

| | | | |
|---|---|---|---|
| 2,431,582 | 11/1947 | Page | 219/442 |
| 2,785,277 | 3/1957 | Jepson | 219/442 |
| 2,889,443 | 6/1959 | Dobmeier | 219/443 X |
| 2,952,764 | 9/1960 | Minami | 219/433 X |
| 3,644,709 | 2/1972 | Hojo | 219/439 |
| 3,764,780 | 10/1973 | Ellis | 219/430 |
| 3,818,180 | 6/1974 | Arosio | 219/441 X |
| 3,908,111 | 9/1975 | DuBois et al. | 219/442 |
| 4,063,068 | 12/1977 | Johnson et al. | 219/441 |

*Primary Examiner*—Volodymyr Y. Mayewsky
*Attorney, Agent, or Firm*—Cushman, Darby & Cushman

[57] ABSTRACT

A rice cooker having a kettle for containing rice, an inner case surrounding and supporting the kettle, first and second heaters separated from each other and mounted within the inner case and adjacent the outside surface of the kettle for heating the kettle and the contents thereof and first and second switches electrically connected to the heaters to control the energization and deenergization of the heaters so as to heat the kettle by three heating stages to obtain boiled rice of most excellent taste.

14 Claims, 7 Drawing Figures

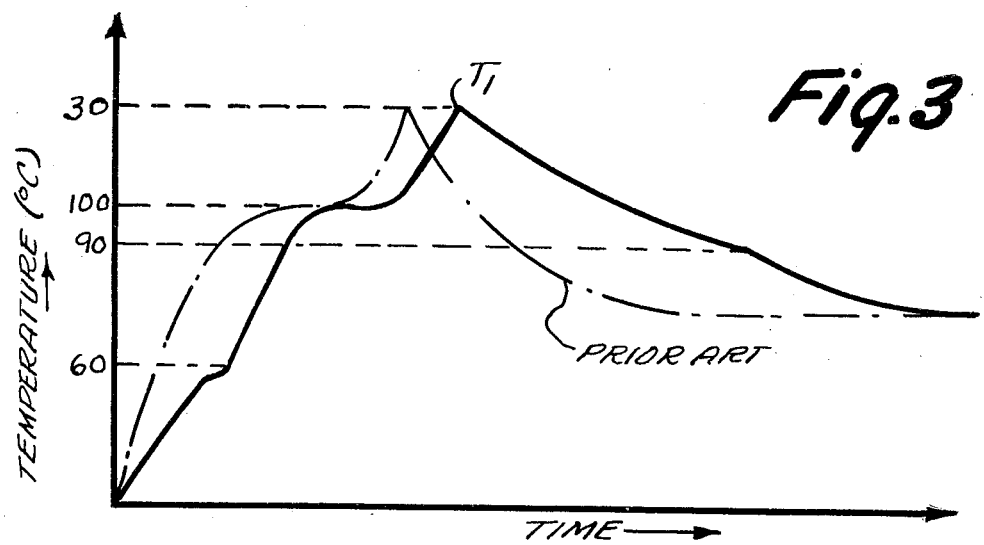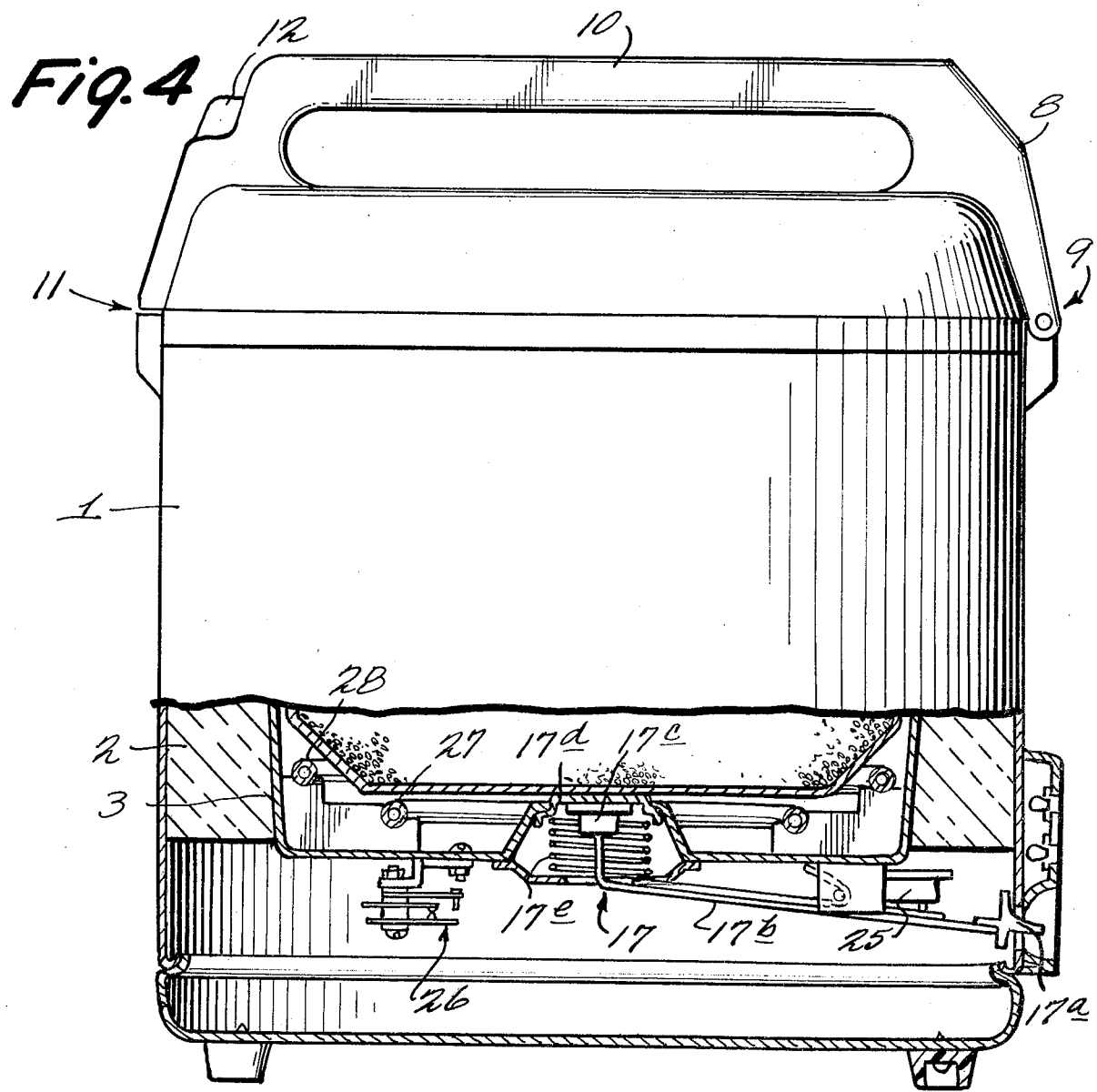

ELECTRIC RICE COOKER WITH TWO HEATERS

This invention relates to an electric rice cooker and more particulary to an improvement in heating with an electric heater.

Generally, it is well known that the best way to boil rice in a cooker of most excellent taste is to heat the cooking kettle and rice with a weak flame during a first heating stage and then in a second stage to heat with strong flame until almost all the water in the rice cooker is vaporized to the so called dried up condition, and then in a third stage again with a weak flame.

Prior electric rice cookers have a cooking kettle, an electric heater to heat the cooking kettle and a thermoswitch to control the electric heater by detecting the temperature of the bottom of the cooking kettle. In these prior electric rice cookers, it is very difficult to boil rice of excellent taste because the electric heater is energized by constant heating capacity until the rice inside the kettle is in the dried up condition. The electric heater is then deenergized after the cooking kettle dried up condition is achieved. U.S. application Ser. No. 47,240 filed June 11, 1979 describes one such electric rice cooker.

Accordingly, it is an object of this invention to provide a electric rice cooker which can boil rice of most excellent taste.

It is an further object of this invention to provide a electric rice cooker which can boil rice of most excellent taste providing a automatic switching means to control and to change the total output of first and second heaters as a small output in a first heating stage, a greater output in a second heating stage and output smaller than the output of the second heating stage in a third stage.

This invention can be more fully understood from the following detailed description when taken in conjunction with the accompanying drawing.

FIG. 3 show temperature-characteristic curves of electric rice cooker of FIGS. 1 and 2 and of the prior art;

FIG. 4 is a sectional view of an electric rice cooker according to the second embodiment of the invention;

Figure 1:
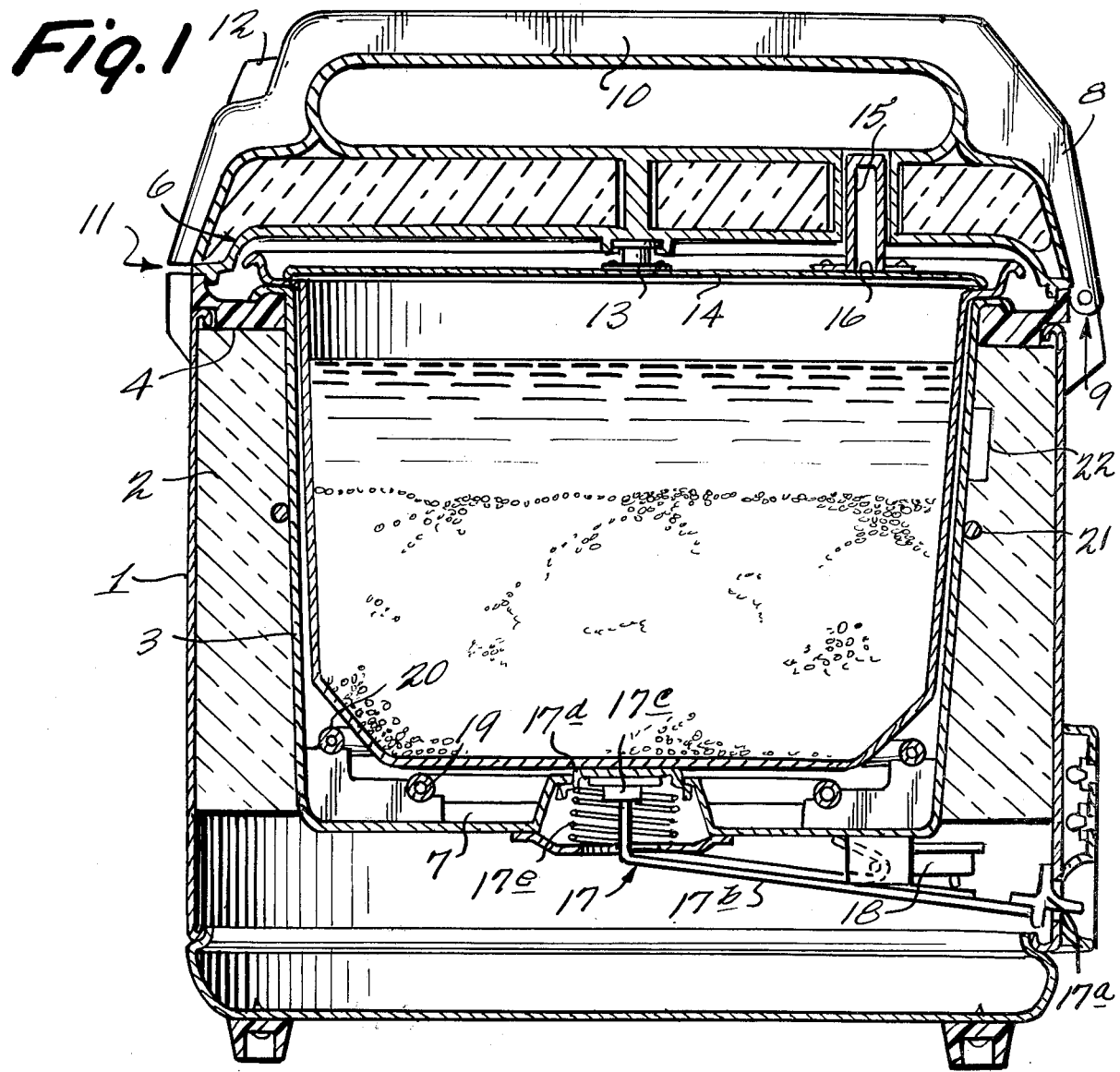
FIG. 1 is a sectional view of an electric rice cooker according to the first embodiment of this invention.
Figure 2:
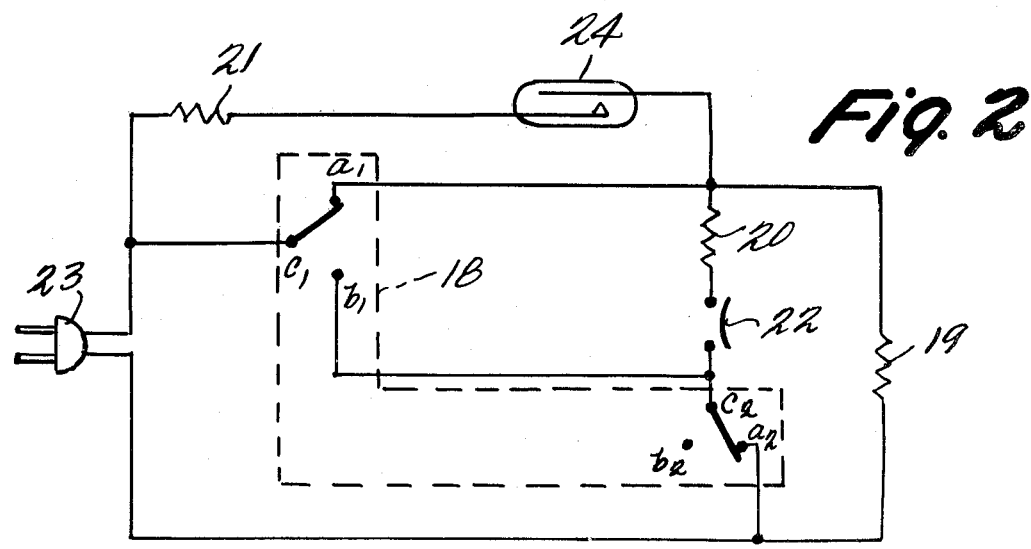
FIG. 2 is a wiring diagram of the electric rice cooker of FIG. 1.

Now there will be described a first embodiment of this invention according to FIG. 1 to FIG. 3. Referring to FIG. 1, a substantially cylindrical outer case 1 has an open top and a substantially cylindrical inner case 3 disposed inside the outer case 1 which is made of an adiabatic material 2. Inner case 3 is made of good heat conductive material, for example aluminum and its surface is treated by, for example chemical polish, to enhance heat reflection. The outer periphery of the top edge of inner case 3 is fitted in a ring frame 4. A kettle 5 is detachably located in the inner case 3 and held as shown in FIG. 1 by its flange 6 which outwardly extends from the edge of the top opening to engage with the edge of the top of inner case 3. Under this condition, the peripheral walls of kettle 5 and inner case 3 are disposed with minimum clearance and the bottom walls of each are separated by a predetermined space 7.

An outer lid 8 covering the top opening of outer case 1 is formed of, for example plastic material, and is rotatably mounted on outer case 1 by hinge member 9. A grip portion 10 is integrally formed on top of outer lid 8. On outer case 1 and outer lid 8 is mounted a lock member 11 which is located on the opposite side from the hinge member 9, to hold outer lid 8 in a closed position. Outer lid 8 can be released by pushing a push button 12. Inner lid 14 is secured to the inner surface of outer lid 8 by support member 13. Inner lid 14 is constructed to contact along its outer periphery with the outer periphery of the top of the opening of kettle 5. A vapor exhaust cylinder 15 includes a ball valve 16 to open and close the vapor exhaust cylinder 15 responsive to the difference of inner and outer pressure of kettle 5. A space is provided between the inside of the bottom of outer casing 1 and the outside of inner case 3.

Operating member 17a of temperature responsive operating switch means 17 is mounted with a part projected outward of outer case 1 and connected to holding member 17c by lever 17b. Holding member 17c is, for example, a permanent magnet and is attracted against a force of coil spring 17e to a magnetic member 17d which loses its magnetic property at the magnetic transformation point when operating switch is manually closed. Magnetic member 17d has a character to rapidly decrease its magnetic permeability at a predetermined temperature $T_1$ (for example 130° C.). Thus, operating switch means 17 is constructed such that the magnetic attractive force between holding member 17c and magnetic member 17d disappears at the predetermined temperature $T_1$ so that a microswitch 18 is changed from a first closed position to a second closed position. Substantially ring shaped first electric heater 19 and second electric heater 20 are provided for cooking heaters in the space 7, and substantially ring shaped third electric heater 21 is provided for a warming heater and is in contact with the outer periphery of outer case 1. These first, second and third electric heaters are for example sheathed heaters, and first and second electric heaters have the same capacity, for example 300 W. A bimetal type temperature sensitive switch 22 is located in the upper outer periphery of the inner case 3 to detect the temperature of inner case 3, and closes when the detecting temperature exceeds, for example 90° C. Then, temperature sensitive switch 22 and microswitch 18 function as automatic switching means.

The operation of the electric circuit will be explained according to the FIG. 2. Because microswitch 18 is a switch of two circuit exchanging type, contact ($c_1$–$a_1$) and ($c_2$–$a_2$) are closed at the first closed position by operating the operating member 17a, and contact ($c_1$–$b_1$) and ($c_2$–$b_2$) are closed at the second closed position by operating operating member 17a. Between each terminal of a source plug 23 are serially connected a contact ($c_1$–$a_1$) of microswitch 18 and first electric heater 19 and, a series circuit comprising second electric heater 20, temperature sensitive switch 22 and contact ($c_2$–$a_2$) of micro-switch are connected 18 in parallel with first electric heater. Stationary contact $b_2$ of microswitch 18 is separate from the electric circuit, and stationary contact $b_1$ is connected to movable contact $c_2$. A series circuit comprising third electric heater 21 and thermostat switch 24 are connected in parallel with contact ($c_1$14 $a_1$) of microswitch 18.

The operation of this invention will now be described with reference to FIG. 1 to FIG. 3. FIG. 3 shows a temperature characteristic curve of the rice cooker. The vertical line indicates bottom temperature D of the kettle 5 and the horizontal line indicates cooking time T. The solid line indicates a curve of this invention and the dashed line indicates a curve of a prior art rice cooker as described above.

First, a predetermined quantity of rice and a quantity of water corresponding to the quantity of rice are put into kettle 5. After loading kettle 5 in the inner case 3, inner lid 14 and outer lid 8 are closed and source plug 23 is connected to an electric power source (not shown). Operating member 17a is manually operated to cause the microswitch 18 of operating switch 17 to change to the first closed position. Both contact ($c_1$–$a_1$) and ($c_2$–$a_2$) are now closed. Only the first electric heater 19 is energized by 300 W through the contact ($c_1$–$a_1$) of microswitch 18, because the temperature of inner case 3 is below 90° C., so that the temperature sensitive switch 22, detecting the temperature of inner case 3, is open. Cooking starts, and the temperature of the kettle 5 gently rises.

When the temperature of kettle 5 rises over 60° on the bottom, and the temperature of inner case 3 (especially the temperature of the portion where the temperature sensitive switch is fixed) rises over 90° C., temperature sensitive switch 22 turns to a closed position and first electric heater 19 and second electric heater 20 are connected to the source plug 23 (namely electric power source) in parallel, so kettle 5 is heated at double heating capacity (600 W). After the bottom temperature of kettle 5 rises to about 100° C., the bottom temperature of kettle 5 is kept at about 100° C. until the water in the kettle 5 has evaporated.

After that, when the water in the kettle 5 have gone to the so called dried up condition, the bottom temperature rises and at the same time the temperature of the magnetic member 17d rises. When the temperature of magnetic member 17d reaches predetermined temperature $T_1$ (130° C.), the magnetic permeability of the magnetic member 17d decreases suddenly. As a result, holding member 17c is moved downwardly by the force of the coil spring 17e because the holding member 17c is released from attractive force of magnetic member 17d. Then, contacts ($c_1$–$b_1$) and ($c_2$–$b_2$) are closed because microswitch 18 is changed from a first closed position to a second closed position. Since first and second electric heaters 19 and 20 are connected in series to the source plug 23, the total electric power consumption of heaters 19 and 20 are reduced. Accordingly, kettle 5 is heated by a lower heating capacity (150 W). When the bottom temperature drops below about 90° C., temperature sensitive switch 22 opens because the temperature of the inner case 3 is below about 90° C., and as the first and second heater 19 and 20 are deenergized, the cooking ends. After this, kettle 5 is kept at a predetermined warming temperature because third and first electric heater 21 and 19 are connected in series and intermittently energized by the action of the thermostat.

In the foregoing embodiment, the kettle 5 is heated at comparatively small heating rate (300 W) by first electric heater 19 in a first heating stage, is heated at a greater heating rate (600 W) by the first and second electric heater connected in parallel to the electric power source in a second heating stage and is heated at lesser rate (150 W) by the first and second heater connected in series to the electric power source in a third heating stage. Thus it is possible to heat the kettle 5 according to the ideal temperature changing steps to get an excellent taste cooked rice. Especially, according to this embodiment, as first and second electric heater 19 and 20 have the same 300 W rated output, it is possible to make an inexpensive cooker because it is unnecessary to use heat resisting expensive material as a shell of the heater even if electric heaters 19 and 20 are constructed as sheathed heaters.

Figure 5:
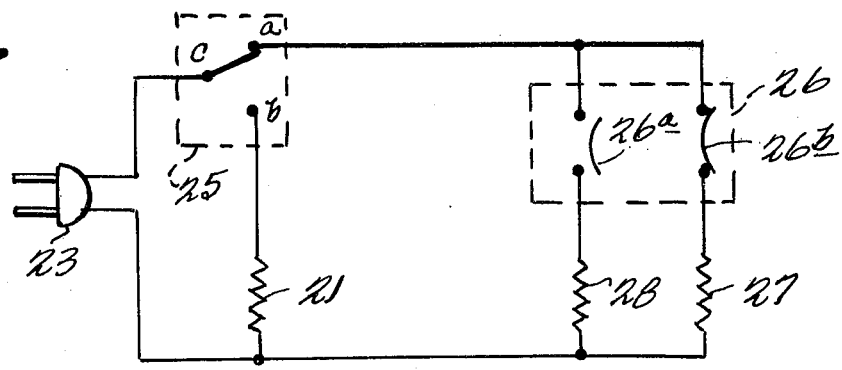
FIG. 5 is a wiring diagram of the electric rice cooker of FIG. 4.

In FIG. 4 and FIG. 5 are shown the second embodiment of this invention. In this embodiment single pole microswitch 25 replaces double pole microswitch 18 a thermoswitch 26 of bimetal type is located on a outer surface of the botton of the inner case 3 to detect the temperature of inner case 3. The electric circuit is constructed as shown in FIG. 5 to provide a first electric heater 27 having a 350 W rated output and a second electric heater 28 having a 650 W rated output replacing first and second electric heaters 19 and 20 having each 300 W rated output. In this embodiment, microswitch 25 is constructed to close the constact (c–a) when it is changed to a first closed position by operating a operating member 17a, and to close the contact (c–b) when it is changed to a second closed position. Thermoswitch 26 has a normally open contact 26a and normally closed contact 26b so that normally open contact 26a will close for the first time when the detected temperature of the kettle 5 exceeds for example 60° C. and the normally closed contact 26b will be opened for the first time when the detected temperature of the kettle 5 exceeds for example 110° C. Then, microswitch 25 and thermoswitch 26 function as automatic switching means.

According to above mentioned second embodiment, only the first electric heater 27 is energized to heat at a rate of 350 W in the first heating stage, and after that, the first and second electric heaters 27 and 28 are energized to heat at a rate of 1000 W in a second heating stage because the second electric heater 28 is also energized when the normal open contact 26a is closed when the bottom temperature of the pot 5 exceeds 60° C. Only the second electric heater 28 is energized to heat at a rate of 650 W in a third heating stage as the normal close contact 26b is opened because the bottom temperature of the kettle 5 exceeds 100° C. by the dried-up condition of the kettle 5. Thus, it is possible to heat the kettle 5 according to the ideal temperature steps to get a excellent taste rice by the second embodiment as good as the first embodiment.

Figure 6:
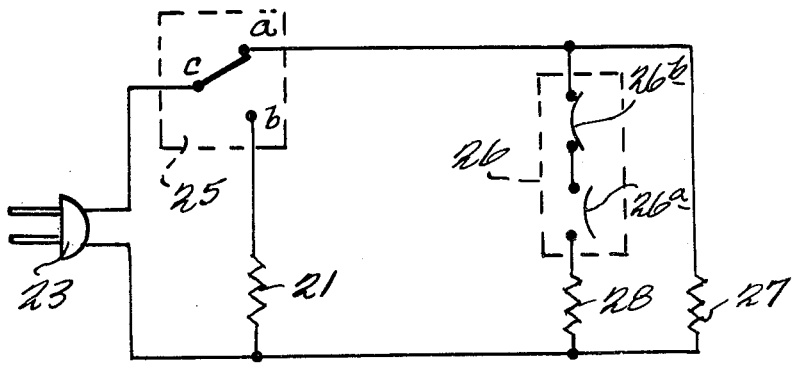
FIGS. 6 and 7 are wiring diagrams of electric rice cookers of third and fourth embodiments thereof.
Figure 7:
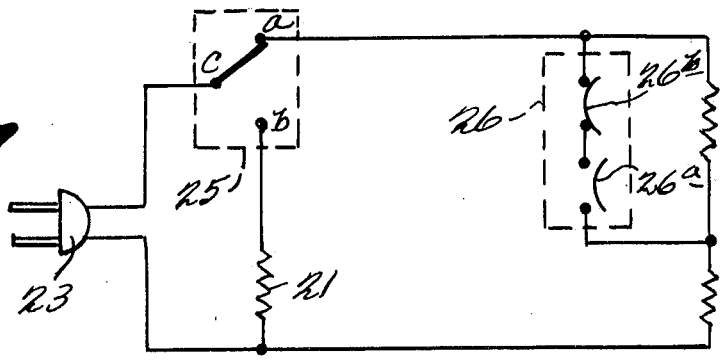

This invention is not restricted to the above mentioned embodiment. For example, the electrical circuit may be constructed as a third embodiment shown in FIG. 6 or it may be constructed as a fourth embodiment providing first and second heaters 29 and 30. Each heater 29 and 30 has rated output of 1000 W and is connected to microswitch 25, thermo-switch 26 etc. as shown in FIG. 7. In this fourth embodiment, kettle 5 is heated by first and second heaters 29 and 30 providing about 500 W of total power when connected in series during the first heating stage. During the second heating stage, heating is provided only by the second heater 30 because the normal open contact 26a of thermoswitch 2 is closed at about 60° C. In the third heating stage the first and second heaters 29 and 30 again both provide heat because the normal closed contact 26b of the thermoswitch 26 is opened at about 100° C.

What we claim is:

1. A rice cooker comprising:

a cooking kettle for containing water and rice to be cooked, a removable lid covering the top of said kettle, a case surrounding and supporting said kettle, a first heater mounted within said case and adjacent the outside surface of said kettle for heating said kettle and the contents thereof, a second heater separated from said first heater and mounted within said case and adjacent the outside surface of said kettle for heating said kettle and the contents thereof, first switch means adapted for electrically connecting at least one of said heaters to a source of electrical energy and for changing from a first to a second condition when the temperature at said first switch means exceeds a first predetermined value, second switch means adapted for electrically connecting at least one of said heaters to a source of electrical energy and for changing from a first to a second condition when the temperature at said second switch means exceeds a second predetermined value, and means for connecting said first and second switch means to said first and second heaters so that, until said first switch means changes from said first to said second condition, the total heat produced by said first and second heaters is at a first rate and thereafter the total heat produced is at a greater rate and, when said second switch means changes from said first to said second condition, the total heat produced by said first and second heaters is at a rate less than said greater rate.

2. The electric rice cooker according to claim 1 wherein said first and second electric heaters are connected and changed by said first and second switch means in a relationship to produce heat at said first rate by only said first electric heater, to produce heat at said greater rate by both said first and second heaters, both connected to the source in parallel, and to produce heat less than said greater rate by said first and second heaters, both connected to the source in series.

3. The electric rice cooker according to claim 1 or 2 wherein said second switch means is connected in series with said second heater and the serial connection thereof connected in parallel with said first heater and said first switch means connects said heaters in parallel in said first condition and in series in said second condition.

4. The rice cooker according to claim 3 wherein said first switch means includes a first switch in series with said second heater for opening when said temperature exceeds said predetermined value and a second switch connecting in said first condition said source to a connection between said first heater and said serial connection and in said second condition said source to the other end of said serial connection.

5. The electric rice cooker according to claim 1 wherein said first and second electric heaters are connected and changed by said first and second switch means in a relationship to produce heat at said first rate by only said first electric heater, to produce heat at said greater rate by said first and second heater both connected to the source in parallel and to produce heat at less than said greater rate by said second heater only.

6. The electric rice cooker according to claim 1 wherein said first and second electric heaters are connected and changed by said first and second switch means in a relationship to produce heat at said first rate by only said first electric heater, to produce heat at said greater rate by said first and second heater both connected to the source in parallel and to produce heat less than said greater rate by said first heater only.

7. The electric rice cooker according to claim 1 wherein said first and second electric heaters are connected and changed by said first and second switching means in a relationship to produce heat at said first rate by said first and second electric heater both connected to the source in series, to produce heat at said greater rate by said first and second electric heaters, both connected to the source in parallel and to produce heat less than said greater rate by said first and second electric heater both connected to the source in series.

8. The electric rice cooker according to claim 1 or 2 further including a third electric heater and a thermoswitch both for warming the kettle and the contents thereof and are connected in series with said first electric heater when the kettle and the contents thereof are warming.

9. The electric rice cooker according to claim 5, 6 and 7 further comprising a third electric heater connected in parallel with said first and second electric heaters.

10. The electric rice cooker according to claim 1 and 2 wherein said said second switch means includes a temperature responsive operating switch means mounted near said inner case and having a magnetic member which rapidly decreases its magnetic property at said second predetermined temperature.

11. The electric rice cooker according to claim 1 or 5 wherein said first switch means is connected in series with said second electric heater and said second switch means is connected in series with said first electric heater.

12. The electric rice cooker according to claim 1 or 6 wherein said first and second switch means are connected in series with said second electric heater and in parallel with said first electric heater.

13. The electric rice cooker according to claim 1 or 7 wherein said first and second electric heaters are connected in series with said source of electrical energy and said first and second switch means are connected in series with said second electric heater and in parallel with said first electric heater.

14. The electric rice cooker according to claim 1 wherein said case includes an outer casing and an inner casing supported within said outer casing.

* * * * *